No. 752,687. PATENTED FEB. 23, 1904.
E. C. KIRK.
HEAT RETAINER.
APPLICATION FILED JUNE 5, 1903.
NO MODEL.
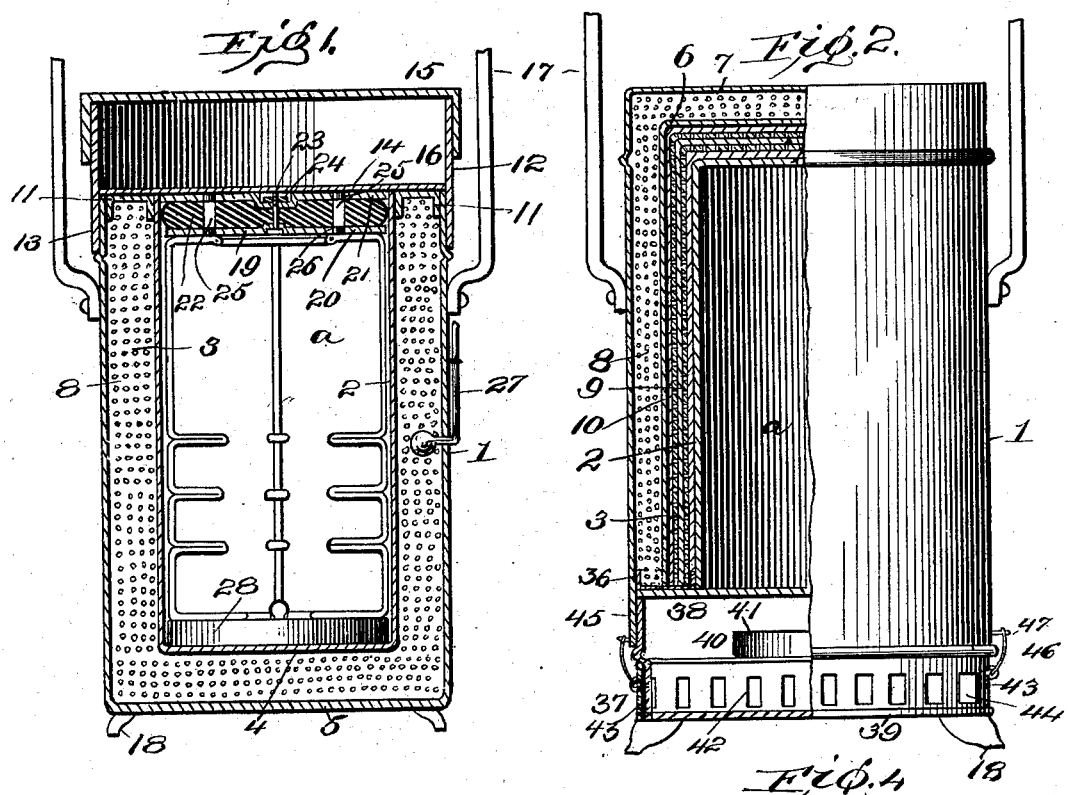
Inventor
Edward C. Kirk
Witnesses No. 752,687.

Patented February 23, 1904.

UNITED STATES PATENT OFFICE.

EDWARD C. KIRK, OF PITTSBURG, PENNSYLVANIA, ASSIGNOR OF ONE-HALF TO HYLAND C. KIRK, OF WASHINGTON, DISTRICT OF COLUMBIA.

HEAT-RETAINER.

SPECIFICATION forming part of Letters Patent No. 752,687, dated February 23, 1904.

Application filed June 5, 1903. Serial No. 160,237. (No model.)

*To all whom it may concern:*

Be it known that I, EDWARD C. KIRK, a citizen of the United States, residing at Pittsburg, in the county of Allegheny and State of Pennsylvania, have invented certain new and useful Improvements in Heat-Retainers; and I do hereby declare the following to be a full, clear, and exact description of the invention, such as will enable others skilled in the art to which it appertains to make and use the same.

My invention relates to an apparatus for retaining heat in foods; and it consists, essentially, of the novel construction and peculiar arrangement of the several parts, as will be hereinafter described, and stated in the claims.

One of the primary objects of the invention is to provide suitable packing between the walls of the apparatus which shall be capable of maintaining the requisite temperature in food for a considerable length of time without causing the quality of the food to deteriorate.

Other objects of the invention will become apparent upon a more detailed description thereof.

In the drawings, Figure 1 is a vertical sectional view of my improved apparatus; Fig. 2, a similar view of a modified form thereof; Fig. 3, a vertical sectional view of a modified form of cover, and Fig. 4 a perspective view of the food-rack.

In the several views the numeral 1 indicates an outer wall, and 2 an inner wall, of any suitable shape, preferably cylindrical, and of any suitable material, the inner wall being preferably of aluminium or aluminium alloy. Each wall is closed at one end, and the inner wall is of less diameter and length than the outer wall, so as to form a space 3 between said walls and closed ends for containing a packing of non-conducting and heat-retaining material or substance.

In Fig. 1 I have shown the lower end of each wall closed, as indicated by the numerals 4 and 5, respectively, and in Fig. 2 the upper end of each wall is shown closed, as indicated at 6 and 7, respectively; but in either case the space 3 is continuous between said closed ends.

In providing means for retaining the heat within the food-containing chamber *a* I employ a packing 8 of some non-conducting or heat-retaining substance consisting of any pulverized substance capable of being made into a plastic mass or dough and by fermentation (the use of yeast) forced air or chemicals be expanded into a lightened mass of minute air-cells calculated to prevent the passage of heat, or I may divide the space 3 into two spaces, employing in one space the packing 8 and in the other space a packing 9, of any suitable material, preferably alternate layers of perforated and non-perforated material, such as paper, cloth, &c.

As shown in Fig. 1, the packing employed in space 3 is composed of flour, yeast, and a small percentage of glue or paste, mixed with a sufficent quantity of water to form dough. The packing when placed in the space 3 is expanded within said space against the walls inclosing the space into a cellular mass by any suitable means, preferably by the application of heat.

Other heat-retaining substances, such as pulp-paper, may be used as a packing, the expansion being accomplished by forcing air into the mass.

As shown in Fig. 2, the space 3 may be divided into two parts by a partition 10, of metal, paper, or other suitable material, similar in shape to the walls 1 and 2, the space between the inner wall 2 and the partition being filled with the packing 9 and the space between the partition and the outer wall 1 being filled with the packing 8. The packing 9 being composed of alternate layers of perforated and non-perforated paper or cloth, it will be evident that closed air-cells will be formed, and whatever form or method may be employed in developing the heat it will be absorbed and retained in the air-cells. The two packings are so arranged that one or both may be employed in conserving the heat, according to the exigencies of the season or special requirements of the food.

After the packing has been placed in the space 3 the same is closed at the open ends by fitting a detachable ring-closure 11 between the inner and outer walls.

In very warm weather one of the packings only may be used, and the construction is such that both may be withdrawn for the purpose of renewal or changing from the double to the single form of packing.

The apparatus is provided with a suitable cover 12, having a flange 13 to fit over the outer wall, and a bottom 14, between which bottom and the top 15 is a chamber 16 for the reception of cold desserts, bread, &c.

The apparatus is provided with a suitable handle 17 and with legs 18, and the mouth of the food-containing chamber $a$ is provided with a suitable closure 19, preferably composed of two metal disks 20 and 21 and an intermediate disk of rubber 22, secured together by a bolt 23 and a thumb-nut 24. By expanding the rubber disk, which is accomplished by turning the thumb-nut, the closure is made to tightly fit the mouth of the chamber $a$, and thereby prevent the admission of air to said chamber. If, however, the chamber $a$ should at any time require ventilation, the closure may be readily removed for this purpose and then replaced; but any of the well-known methods of ventilating the chamber $a$ may be employed, if found desirable— such, for instance, as providing the disks 21 and 22 with openings 25 and the disk 20 with openings 26. By loosening the nut 24 and turning the disk 21 to bring its openings in register with the openings 25 suitable ventilation will be provided. In order to ascertain and thus regulate the temperature of the packing and incidentally the chamber $a$, I provide a thermometer 27, which is so shaped and attached that the bulb is situated within the space 3. As thus arranged the temperature of the chamber $a$ can be readily ascertained at all times.

Preferably situated within the chamber $a$ is a heating-block 28, of aluminum or aluminum alloy, which has the peculiar property of absorbing a large amount of heat and releasing the same very slowly.

Various agencies have been devised to maintain the heat within the food-containing chamber of this character of apparatus; but none of them appear to be successful in maintaining the heat at such a temperature as will preserve the food unchanged and in proper condition. In practice I have found that aluminium or aluminium alloy absorbs the heat more quickly and readily and releases the heat more slowly than any other agency now in use.

Supported upon the heating-block is a food-rack 29, made of wire and bent into suitable shape to form a base 30, seat-arms 31, and a top connection 32. The top connection has its projecting ends joined together by a wire 33, and wire 34, bent to form seat-arms 35, corresponding with the arms 31, is connected to said top connection and the base, as shown in Fig. 4.

In the modification shown in Fig. 2 each wall has its upper end closed, and the lower end of chamber 3 is closed by a detachable closure 36, and the apparatus is supported upon a base 37, having a top 38 and a bottom 39, forming therebetween a combustion-chamber 40 for the reception of a suitable heater 41, preferably a carbonaceous cartridge, as shown. The lower portion of the wall of the base is provided with openings 42, and a rotatable ring or band 43, provided with openings 44, serves as a damper to regulate the supply of air to the combustion-chamber or to cut off the supply entirely. In this construction of apparatus the food-rack is supported within the chamber $a$ upon the top 38 of the base, and consequently the closure 19 is dispensed with. The lower end of the outer wall is provided with a downwardly-extending flange or collar 45, which fits over the base, and the walls are detachably secured to the base by any suitable means, preferably by hooks 46 and eyes 47.

In the modification illustrated in Fig. 3 the closure for the chamber $a$ is shown attached to the bottom of the cover and consists of a downwardly-extending stopper 48, having a slightly-tapering wall, so as to provide for a tight fit when forced into the mouth of the chamber. In this form of stopper or closure the ventilation of the chamber $a$ may be accomplished by providing the bottom 14 of the cover with suitable openings 49 and arranging a rotatable damper 50, having registering openings, on a shaft or rod 51.

Various other modifications or changes in the details of construction may be made without departing from the spirit of my invention or sacrificing the principle thereof.

Having thus fully described my invention, what I desire to secure by Letters Patent is—

1. A heat-retaining apparatus, comprising a double-walled body, said walls being separated from each other, forming a space therebetween, and a porous packing composition expanded within said space and against said walls.

2. A heat-retaining apparatus, comprising a double-walled body, said walls being separated from each other, forming a space therebetween, and a porous packing composition within said space, said composition having been placed within the space while in a plastic state, and then expanded against the walls of the body.

3. A heat-retaining apparatus, comprising a double-walled body, said walls being separated from each other, forming a space therebetween, a partition dividing said space, a porous packing composition expanded within one part of the divided space and against the walls inclosing said part, and a packing of any suitable material, different from said composition, within the other part of said space.

4. A heat-retaining apparatus, comprising a double-walled body, said walls being separated from each other, forming a space therebetween, a porous packing composition expanded within said space and against said walls, and suitable heating means.

5. A heat-retaining apparatus, comprising a double-walled body, said walls being separated from each other, forming a space therebetween, a partition dividing said space, a porous packing composition expanded within one part of the divided space and against the walls inclosing said part, a packing of any suitable material, different from said composition, within the other part of said space, and a suitable heater.

6. A heat-retaining apparatus, comprising a double-walled vessel having a food-containing chamber, the walls of said vessel being separated from each other to form a space for the reception of packing, a porous packing composition expanded within said space and against said walls, a food-rack situated in the food-containing chamber, and a heater for maintaining the temperature within said chamber.

7. A heat-retaining apparatus, comprising a double-walled body, said walls being separated from each other, forming a space therebetween, a partition dividing said space, a porous packing composition expanded within one part of the divided space and against the walls inclosing said part, and a packing composed of alternate layers of perforated and non-perforated material within the other part of said space.

In testimony whereof I affix my signature in the presence of two witnesses.

EDWARD C. KIRK.

Witnesses:
    MAUD P. KIRK,
    ALICE SIRES.